Patented Dec. 17, 1935

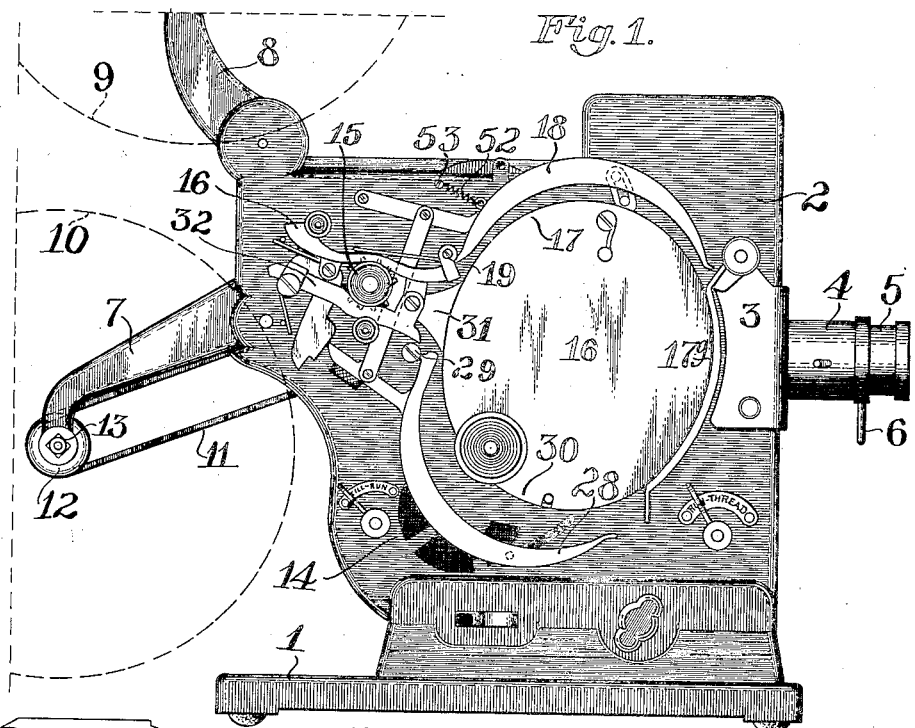

2,024,660

UNITED STATES PATENT OFFICE 2,024,660

AUTOMATIC FILM-THREADING CONTROL

William A. Riddell, Rochester, N. Y., assignor to Eastman Kodak Company, Rochester, N. Y., a corporation of New York Application March 12, 1930, Serial No. 435,126

24 Claims. (Cl. 88—17)

This invention relates to photography, and more particularly to motion picture apparatus. One object of my invention is to provide a machine which may be threaded by a single operation. Another object of my invention is to provide a machine with mechanism for insuring the proper sequence of operation and the proper speed of operation during the threading and running operations. Another object of my invention is to provide a machine of the class described in which the film guiding mechanism controls the speed of the film feeding device. Still another object of my invention is to provide a mechanism with movable means for guiding the film correlated with a variable speed drive for the film moving mechanism all under the control of the film. Still another object of my invention is to reduce the film threading operations to a minimum and other objects will appear from the following specifications, the novel features being particularly pointed out in the claims at the end thereof.

Coming now to the drawing wherein like reference characters denote like parts throughout:

Figure 1 is a side elevation of a motion picture machine equipped with automatic operating mechanism constructed in accordance with and embodying a preferred form of my invention, Figure 2 is a side elevation of certain parts of the operating mechanism removed from a motion picture machine and constructed in accordance with a second embodiment of my invention and, Figure 3 is a fragmentary side elevation illustrating still another form of my invention.

In certain types of motion picture apparatus, film is moved through a series of guideways forming a channel or tunnel-like structure which directs the film to the film moving mechanism, past the film gate and forms suitable loops on both sides of the pull-down mechanism.

Such means are in use, are shown in a number of patents, and my present invention is for an improvement over the machines particularly shown in the following Patents: 1,645,882 A. Stuber October 18, 1927, 1,694,110 H. Wellman December 4, 1928, 1,711,977 E. Underwood May 7, 1929 and 1,745,874 A. Stuber et al. February 4, 1930.

It has been found desirable to run the machine more slowly through the film threading operation or during that part of the time that the film is passing through the guideways than it is to run during its normal operation. Heretofore this has been either done entirely by hand or has been omitted. It has also been necessary, as shown in the above patents, to manually adjust the film guiding members to and from an operative or threading position, it being customary to stop the machine manually, adjust the guide members manually, and start the mechanism again manually after usually adjusting a rheostat to control the speed of the machine.

My invention provides a means for eliminating all these manual steps and, in addition, making sure that the proper steps of threading are taken in timed relation. It reduces the possibility of improper threading to a minimum and makes a machine far more easily threaded than would otherwise be the case.

As indicated in Figure 1, a machine suitable for use with my present invention may consist of a base 1, having an upstanding plate 2, carrying the usual lens mount 3. This may consist of a tubular member 4 in which a second tubular member 5, which carries the objective, is mounted. Member 5 may be moved for focusing the apparatus by means of a handle 6 in the usual manner.

On the rear side of plate 2 there are a pair of arms 7 and 8. Arm 8 is adapted to carry a supply reel, indicated in broken lines at 9, and arm 7 is adapted to carry a take-up reel 10, this latter reel being driven to a belt 11 which turns a pulley 12 which, in turn, is permanently attached to a shaft 13.

As indicated in the above-mentioned patents, the entire machine may be driven by a motor here shown diagrammatically as 14. This motor is connected to the various moving parts such as the film sprocket 15 and a pull-down mechanism enclosed in the housing 16 by a series of gears which are behind the plate 2 and which form no part of the present invention. They may be of any standard type.

Broadly speaking, a film is drawn from a supply reel 9, passes through a series of spaced plates which form tunnel-like guideways for the film, over a sprocket 15 and to the film gate which is broadly designated as 17g. After passing the film gate 17 the film is guided back again to the sprocket 15 and from this sprocket the film passes down still another guideway which is not shown, but which is clearly shown in the patent to Stuber above mentioned and is thus directed to the take-up spool 19. As thus far described the mechanism may be of any preferred type but it is preferably of the type shown in the above-mentioned patents.

More specifically, the film being threaded into the machine is entered into an opening 16 in a film guideway which leads the film to the film sprocket 15. From this film guideway the film passes to a second film guideway which consists of a relatively fixed member 17 and a relatively movable member 18, the latter member being pivotally attached at 19 to the supporting plate 2.

Fom this film guide the film passes to the film gate designated broadly as 17g.

As better shown in Figure 2, the film gate 17g may consist of a relatively fixed plate 18', apertured at 19' for the light beam and apertured at 20 for the pull-down mechanism. Opposite this fixed plate is a relatively movable plate 21 which is apertured at 22 for the light beam and at 23 for the pull-down mechanism. Plate 21 is pivotally and slidably connected to the supporting plate 2 by means of a slot 24 in an enlarged end 25 of plate 21 which may slide freely upon a fixed post 26. A spring 27 normally thrusts the movable plate 21 toward the plate 18.

In the position shown in Figure 2 the film gate is in an open or threading position, that is, it is in a position in which the film may be freely entered between the two plates for threading the film. From this position it may move to an operating position in which the plates are very nearly in contact, a film merely lying between the two plates. The pressure of spring 27 is sufficient to hold plate 21 toward plate 18' and to hold a film in a fixed position between these two plates.

From the film gate 17g the film is guided through that part of the tunnel which consists of a movable guide member 28 pivotally mounted at 29 to the supporting plate 2 and lying opposite a relatively fixed surface 30 which may consist of a wall used for the housing 16. A curved guideway 31 directs film into still another section of the tunnel-like guide which consists of a guide 32. This guide, as shown in the patents above mentioned, may consist of an oblong box-like structure having an opening through which the film may freely pass.

From the guide 32 the film is led downwardly to the spool 10 in a manner fully shown and described in the patent to A. Stuber above mentioned.

It should be noted that the movable portions of the tunnel-like guide are connected together so that they will move together. Referring particularly to Figure 2, guide member 18 is provided with a stud 33 which engages in the forked end 34 of a lever 35. Lever 35 is pivotally mounted upon a stud 36.

Lever 35 carries an offset arm 37 with a contact member 38 adapted to make a circuit between the two terminals 39 and 40, these terminals being connected up by means of wires 41 and 42 through a resistant 43 to a motor 14. When the parts are in the position shown in Figure 2 the resistant 43 is thrown in so that the motor 14 will turn more slowly than would otherwise be the case.

Lever 35 carries a stud 44 by which it is connected to a link 45, this link being pivotally attached at 46 to an arm 47 which is fastened to the movable guide member 28.

As in some of the previous self-threading machines as illustrated in the above-mentioned patents, the film gate 21 is moved in timed relation with the guide members 18 and 28. The ends of these guide members 48 and 49 are adapted to engage with the cam surfaces 50 and 51 of the gate member 21. Consequently when the guide members 18 and 28 are moved to the position shown in Figure 2 these cam members are engaged in such a manner that the gate member 21 is thrust into its inoperative position.

When, however, the guide members 18 and 28 are moved from the position shown in Figure 2 to the position shown in Figure 1, the spring 27 thrusts the gate member 21 toward the gate member 18 so that the plates lie substantially in contact, that is to say, they lie sufficiently close to contact with the edges of a film passing between these two members.

In order to normally hold the guide members 18 and 28 in an open or running position and to permit the gate member 17g to lie in a closed or operative position, the following mechanism is employed. The guide member 18 is attached to a spring 52 which is attached to a stud 53 carried by the plate 2. This spring normally exerts a tension on the guide member 18 to turn it in the direction shown by the arrow in Figure 2. Since this guide member is connected by the linkage just above described with the bottom movable guide member 28, this member is also moved in the direction shown by the arrow at Figure 2 about its pivotal point 29.

To prevent the movement of spring 52 so as to open the guide members 18 and 28 I provide a latch 54 on the end of arm 47. This latch is adapted to engage a movable latch member 55 which is notched at 56 and which is mounted to turn upon a stud 57.

The latch is normally adopted to turn about the stud in the direction shown by the arrow in Figure 2 under the impulse of spring 58.

Latch member 55 is provided with an arm 59 curved in cross section and extending through an aperture 60 in the upper guide plate 61. This guide plate is spaced from a second guide plate 62 a distance to permit a film F to move freely between the plates.

The spring 58 normally presses the arm 59 into engagement with the lower plate 62. When, however, a film F passes the sprocket 15 and is driven down the guideway between plates 61 and 62, the arm 59 rides up on the film and turns the latch member against the action of spring 58 a short distance permitting the notched end 56 to ride away from the end 54 of member 47.

As soon as this action takes place under the impulse of the power drive, that is the spring 52, the movable guide members are returned to their inoperative or running positions while the gate member through the contact of parts 48 and 49 and cams 50 and 51 springs back under the influence of spring 27 into an operative position in which the film will be held in position for projection or for receiving an image, according to whether the motion picture apparatus is a camera or projector. Obviously such a self-threading mechanism is equally suited for either of the machines.

It should be noted that arm 47 has upon its lower side a knurled finger piece 63. The reason for having this finger piece is that after a film has been passed through the machine and it is to be again put into position for re-threading an operator thrusts upwardly upon the finger piece 63.

This, through the link 45 and the arm 35 and associated mechanism moves the parts from the position shown in Figure 1, which is the running position, to the position shown in Figure 2, which is the threading position. With the parts in the position shown in Figure 2 it is only necessary to start the motor of the machine and enter a film in the guide member 16 manually until it reaches the film sprocket 15.

When the sprocket 15 engages perforations of the film, the film will be driven through the tunnel-like channel member, around through the various parts of the channel until it again passes sprocket 15, at which time it will, by actuating the latch member 55, release the part and break the contact previously made by the contact member 38 and the points 39 and 40. Thus the resistance 43 will be thrown out and the motor 14 will be permitted to run at its normal speed for the operation of the machine.

In Figure 3 I have shown a modified form of resistance control. In this figure one of the movable guide members 18 is normaly moved in the direction shown by the arrow by a spring 52 attached to a stud 53. The guide member 18 may move upon a shaft 70 and there is a continuation of the guide member in the form of an arm 71 terminating in a gear segment 72. The teeth of this gear segment mesh with a pinion 73 to which is affixed an arm 74. This arm forms a contact which slides over any one of a series of contacts 75 between which are a series of resistances 76. The end resistant is connected by a wire 77 to the motor 14 and the opposite side of the motor is connected by a wire 78 to one of the line wires 79.

The opposite line wire 80 is connected to the arm 74 so that the position of this arm determines the amount of current fed to the motor and consequently the speed of operation of this power drive. With this arrangement the motor speeds up somewhat more gradually than is the case where there is a single resistance as shown in Figure 2 at 43. I find, however, that a single resistance works perfectly satisfactorily.

With a machine constructed in accordance with the description hereinabove, it should be noted that there are two power drives. The first and main power drive, of course, is the motor 14 which drives the sprocket wheel 15 and the pull-down mechanism which is not shown in this application. The sprocket 15 is responsible for moving the film through the tunnel shaped guide and after the film has reached the sprocket a second time, contacts with it on the lower side, and then the sprocket further propels the film toward the latch member 55. When this latch member has been tripped a second power drive is permitted to operate, that is to say, the spring 52 furnishes power which not only moves the guide plate 18 to which it is attached, but it also simultaneously moves guide member 28 and through guide members 18 and 28 the movable section 21 of the film gate 17g is operated so that this inter-connection between the parts causes all of the movable members to move at the same time. Guide members 18 and 28 are moved from a guiding position to a running position and the movable section 21 of the film gate 17g is moved from a threading position to a running position.

In other words a portion of the tunnel like guide member is made wider through the operation of spring 52 and a portion of it is made more narrow at the same time since the gate members come together.

When the machine is being set for rethreading by thrusting upwardly upon the finger piece 63 as above described the point 54 of the arm 47 will lie opposite the cam face 64 of the latch 55. By moving the member the arm 47 and with it the movable film guide 28 about its pivot 29 in the direction opposite to that shown by the arrow in Figure 2, the point 54 is brought into engagement with the latch 56 and will be held in engagement with this part so long as the force of spring 52 is exerted tending to turn the part in the direction shown by the arrow in Figure 2.

While I have described in the above specification preferred embodiments of my invention, it is obvious that other embodiments can be constructed and I intend to include as within the scope of my invention all such embodiments as may come within the scope of the appended claims.

What I claim is:

1. In a motion picture apparatus, a film gate including a relatively fixed plate and a relatively movable plate, a variable speed power drive for the film, means for directing film through the film gate and means controlled by the position of the movable member of the film gate for also controlling the speed of the power drive.

2. In a motion picture apparatus, a tunnel-like film guide including relatively fixed members and a relatively movable member, means for moving said member to and from a film guiding position, a variable speed power drive, a control for the variable speed power drive, connections between the control and the movable member for simultaneously actuating the control to alter the variable speed power drive and the film guide.

3. In a motion picture apparatus, a tunnel-like film guide including relatively fixed members and a relatively movable member, means for moving said member to and from a film guiding position, a variable speed power drive, a control for the variable speed power drive, connections between the control and the movable member adapted to increase the speed of the power drive by moving the movable member from a film guiding position.

4. In a motion picture apparatus, a plurality of film guiding members, some movably mounted and others immovably mounted on a base, power operated means for moving the movably mounted guide members, a power drive, mechanism operated by said power drive for moving a film through the guiding members, and means for controlling the speed of the power drive through the positions of a movable film guide.

5. In a motion picture apparatus, a plurality of film guiding members, some movably mounted and others immovably mounted on a base, power operated means for moving the movably mounted guiding members, said power means being adapted to move said members in one direction, a releasable device for holding said movable members against the moving influence of said power means, a power drive to propel film through said guide members, a variable speed device for controlling the speed of the power drive, and connecting members between the variable speed device and a movably mounted film guiding member for simultaneously actuating both.

6. In a motion picture apparatus, a plurality of film guiding members, some movably mounted and others immovably mounted upon a base, power operated means for moving the movably mounted guiding members in one direction, a releasable device for holding said movable means against the moving influence of said power means, a power drive to propel film through said guide members, a variable speed device for controlling the speed of the power drive, connecting members between the variable speed device and the movably mounted film guiding member for simultaneously actuating both when said releasable device for retarding the movement of the movable guide by its power operated means is moved.

7. In motion picture apparatus, a plurality of film guiding members, some relatively fixed and others relatively movable, connecting members between the movable guide members through which they may be moved together, all of said guiding members constituting a substantially continuous film guiding tunnel, a spring tending to move all of the movable members in one direction through said connections, and a latch mechanism adapted to prevent movement of the movable members and connecting members under the impulse of said spring.

8. In motion picture apparatus, a plurality of film guiding members, some relatively fixed and others relatively movable together constituting a substantially continuous film guiding tunnel, a spring tending to move the movable members in one direction, and a latch mechanism adapted to prevent movement under the impulse of said spring, said latch member being so located relative to the film guiding tunnel that it may be operated by a film passing therethrough.

9. In motion picture apparatus, a plurality of film guiding members, some relatively fixed and others relatively movable, together constituting a substantially continuous film guiding tunnel, a spring tending to move the movable members in one direction, an electric circuit and a switch interconnected to move with said spring, a latch mechanism for holding said switch and film guides against movement by the spring, a power drive connected to the circuit, said latch being under the control of a film passing through said film guide.

10. In motion picture apparatus, a tunnel-like guide for directing film through the machine including a plurality of guide plates, some pivotally mounted and others immovably mounted, connections between two of said pivotally mounted guides including a link and pivoted element movement of which is adapted to turn said elements in opposite directions about their pivots, means normally tending to turn said pivoted elements in one direction and mechanical means to prevent such turning movement, said mechanical means being adjacent a part of the tunnel-like guide and having a part projecting into the path of film passing through said guideway whereby said means may be operated by said film.

11. In a motion picture apparatus, a plurality of guiding members some movably mounted and others immovably mounted upon a base, power operated means for moving the movably mounted guiding members in one direction, a movable device located in the path of film passing through the guiding members and being adapted to be operated by the film passing therethrough, said movable device being adapted to prevent the movement of the guiding members in one direction under the influence of the power operated means, a power drive to propel film through said guide members, a variable speed device for controlling the speed of the power drive, connecting members between the variable speed device and the movably mounted film guiding member for simultaneously actuating both.

12. In a motion picture machine, means for threading a film therethrough comprising means for automatically forming the loops which are necessary because of the intermittent motion of the film through a portion of the machine including a sprocket, means for maintaining the film in the proper exposure position, control means for moving said loop forming means and said film positioning means either to threading or to operating position, a common manually operated means for causing the movement of the loop forming and film positioning means from operating to threading position, and film operated means for releasing said last mentioned means to permit the movement of the loop forming and film positioning means from threading to operating position.

13. In a motion picture machine, means for threading a film therethrough comprising means for automatically forming the loops which are necessary because of the intermittent motion of the film through a portion of the machine including a sprocket, means for maintaining the film in the proper exposure position, control means for moving said loop forming means and said film positioning means either to threading or to operating position, a common manually operated means for moving the loop forming and film positioning means to a threading position and operative means for releasing the loop forming means from a threading position.

14. In a motion picture machine, means for threading a film therethrough comprising a sprocket, means movable to threading and to operating position for automatically forming the loops, positioning means for maintaining the film in proper exposure position, means for moving said loop forming and positioning means from operating position to threading position and means cooperating with the film upon the completion of the threading operation for moving said last mentioned means from threading position to operating position.

15. A motion picture projector which comprises means for automatically threading the film through said projector including a sprocket, means for forming the loops required by an intermittent motion of the film, means for accurately positioning the film at the picture projection point, each of said means being movable to threading and operating position, a single manually operable means for moving all of said means to the threading position and means in cooperative relation to the film which upon the completion of the threading operation may permit moving said threading and positioning means to operating position.

16. In a motion picture machine, means for threading said machine including a sprocket, means for forming loops, a picture film gate adapted to be moved to threading and operating position, a single means for moving said loop forming apparatus and said film gate from operating to threading position, means urging said single means from threading to operating position, and a trigger release retaining means for retaining and releasing the operation of said single means and permitting it to move to the operating position, said trigger being operatively related to the film being threaded through the machine, whereby said film operates to move each of said means into the operating position by coacting with said trigger.

17. In a motion picture machine, means for threading said machine including a sprocket, means for forming loops, a picture film gate and film positioning means, each adapted to be moved to threading and to operating position, a single means for controlling the movement of said means from operating to threading position, means for retaining said single means in threading position, and a film operating trigger release mechanism in cooperative relation with the film at the completion of the threading operation whereby the release mechanism is operated by the film for actuating said last mentioned means to permit said single means to move to operating position, whereby said film operates to move said means into the operating position by coacting with said trigger.

18. In motion picture apparatus, a tunnel-like means for guiding film through a path, a film gate, said tunnel-like means including a plurality of facing film guiding members, some fixedly mounted and some movably mounted whereby the depth of the tunnel-like means may be varied, operable connections between the movably mounted members, power drive, and a control member operable by a film for regulating the application of said power to the movably mounted members.

19. In motion picture apparatus, a series of sets of guide members constituting channels leading from one to the other to constitute a substantially continuous tunnel-like passage through the apparatus, each member forming a portion of a film guideway, at least one of certain sets of the guide members being movably mounted whereby the size of the tunnel-like passageway may be varied in places, a common actuating device interconnected to the movably mounted guide members for moving said members, and a control member therefor under the control of a film passing through the tunnel-like passage adapted to permit the actuating device to move the guide members.

20. In motion picture apparatus, a series of sets of guide members constituting channels leading from one to the other to constitute a substantially continuous tunnel-like passage through the apparatus, each member forming a portion of a film guideway, portion of the channels including movable members and at least one portion including a pair of spaced and relatively fixed guide members between which a film may pass, and a control member located adjacent said fixed guide members and adapted to be acted upon by a film passing therethrough, said control member being interconnected to the movable guide members.

21. In motion picture apparatus, a series of sets of opposed guide members, the members of each set being relatively movable toward and from one another, and when in certain predetermined relative positions constituting channels leading directly from one to the other to constitute a continuous, tunnel-like passage through the apparatus through which the advancing end of a propelled film will be automatically guided, operable connections between the movable guide members and means controlled by the film for adjusting the position of all of said movable members through said operable connections.

22. In motion picture apparatus, a series of sets of guide members constituting channels leading from one to the other to constitute a continuous, tunnel-like passage through the apparatus, each set comprising a member forming the bottom of the tunnel and another member forming the top thereof, at least one member of each set being movable, operable connections between said movable guides, and means controlled by the film for moving the movable member of each set through said operable connections to destroy the continuity of the tunnel.

23. In motion picture apparatus, a series of sets of guide members constituting channels leading from one to the other to constitute a continuous, tunnel-like passage through the apparatus, each set comprising a member forming the bottom of the tunnel and another member forming the top thereof, at least one member of each set being movable, operable connections between all movable members, and means controlled by the completion of the threading of the film for moving the movable member of each set through said operable connections to destroy the continuity of the tunnel.

24. In motion picture apparatus, a series of sets of opposed guide members, the members of each set being relatively movable toward and from one another, and when in certain predetermined relative positions constituting channels leading directly from one to the other to constitute a continuous, tunnel-like passage, through the apparatus through which the advancing end of a propelled film will be automatically guided, operable connections between the movable guide members and means controlled by the completion of the automatic threading of the film for moving all of the movable members through said operable connections from said predetermined guiding positions.

WILLIAM A. RIDDELL.